US007403932B2

(12) United States Patent
Kao et al.

(10) Patent No.: US 7,403,932 B2
(45) Date of Patent: Jul. 22, 2008

(54) TEXT DIFFERENTIATION METHODS, SYSTEMS, AND COMPUTER PROGRAM PRODUCTS FOR CONTENT ANALYSIS

(75) Inventors: Anne S-W Kao, Bellevue, WA (US); Stephen R. Poteet, Bellevue, WA (US); Yuan-Jye Wu, Issaquah, WA (US); William Ferng, Sammamish, WA (US); Robert E. Cranfill, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/173,600

(22) Filed: Jul. 1, 2005

(65) Prior Publication Data

US 2007/0022072 A1 Jan. 25, 2007

(51) Int. Cl.
*G06N 5/00* (2006.01)

(52) U.S. Cl. .......................................... 706/45; 706/47

(58) Field of Classification Search .................. 706/45; 707/6; 382/225

See application file for complete search history.

(56) References Cited

U.S. PATENT DOCUMENTS 5,778,095 A * 7/1998 Davies ....................... 382/225
5,818,965 A * 10/1998 Davies ....................... 382/225
6,233,575 B1 * 5/2001 Agrawal et al. ................ 707/6
6,611,825 B1 8/2003 Billheimer et al.
6,701,305 B1 3/2004 Holt et al.

OTHER PUBLICATIONS

*Reference Manager Introduction*, M. Sampson, Jan. 31, 2002; 13 pages; http://www.chalmersresearch.com/epi6188/Reference%20Manager%20Lessons.pdf.

*Report on the Metadata Harvesting Workshop at JCDL 2003*, S. Warner et al., SIGIR Forum, Fall 2003 (vol. 37 #2); 6 pages; http://www.cs.cornell.edu/people/simeon/worshops/JCDL2003/JCDL2003_OAI_Workshop.pdf.

* cited by examiner

*Primary Examiner*—Wilbert L Starks, Jr.
(74) *Attorney, Agent, or Firm*—Alston & Bird LLP

(57) ABSTRACT

Provided are improved methods, apparatus, and computer program products for text differentiation which involves identifying differences between documents with similar content, not merely similar terms, and generating results. Text differentiation provides the ability to find non-similar, or different, content hidden within documents with similar overall content, but not exactly the same content. Text differentiation may be used to quickly identify key differences between similar documents.

31 Claims, 4 Drawing Sheets

32 START
34 ENTER SEARCH TERMS
36 DOCUMENT COLLECTION
38 ANALYZE DOCUMENTS FOR RELEVANCY TO SEARCH TERMS
40 TEXT DATA ANALYSIS AND/OR DATA MINING PROCESSES
42 EXTRACT LIMITED SET OF DOCUMENTS RELATED TO SEARCH TERMS
44 ANALYZE DOCUMENTS OF SIMILAR CONTENT BY NON-SIMILAR INFORMATION:
-TOPIC WORDS
-ENTITIES
-NAMES
-SUBJECT MATTER
-SECTION/PARAGRAPH TOPICS
46 PRESENT RESULTS BY IDENTIFYING NON-SIMILAR CONTENT OF DOCUMENTS

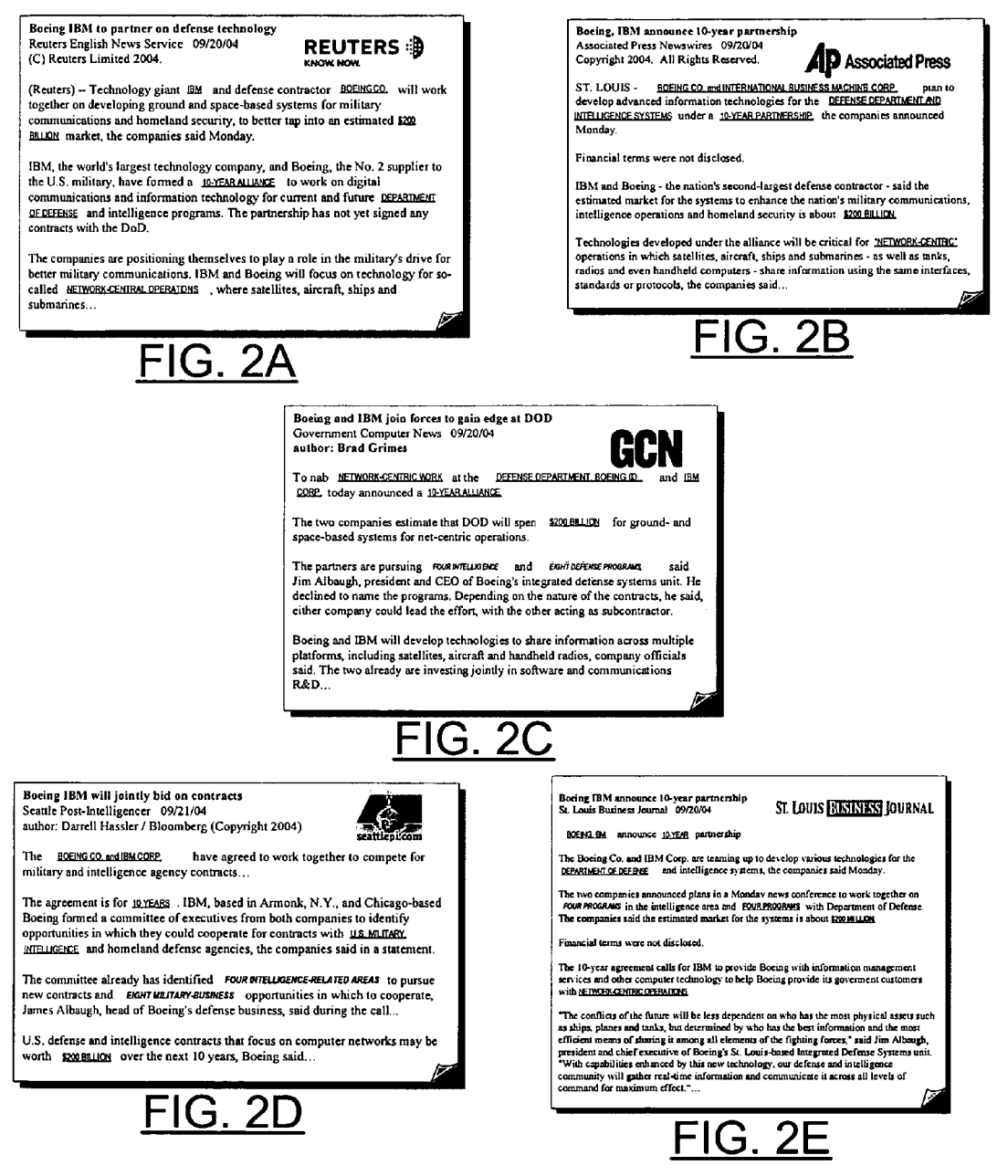

Boeing IBM to partner on defense technology
Reuters English News Service 09/20/04
(C) Reuters Limited 2004.

REUTERS
KNOW. NOW.

(Reuters) – Technology giant IBM and defense contractor BOEING CO. will work together on developing ground and space-based systems for military communications and homeland security, to better tap into an estimated $200 BILLION market, the companies said Monday.

IBM, the world's largest technology company, and Boeing, the No. 2 supplier to the U.S. military, have formed a 10-YEAR ALLIANCE to work on digital communications and information technology for current and future DEPARTMENT OF DEFENSE and intelligence programs. The partnership has not yet signed any contracts with the DoD.

The companies are positioning themselves to play a role in the military's drive for better military communications. IBM and Boeing will focus on technology for so-called NETWORK-CENTRAL OPERATIONS , where satellites, aircraft, ships and submarines...

FIG. 2A

Boeing, IBM announce 10-year partnership
Associated Press Newswires 09/20/04
Copyright 2004. All Rights Reserved.

AP Associated Press

ST. LOUIS - BOEING CO. and INTERNATIONAL BUSINESS MACHINES CORP. plan to develop advanced information technologies for the DEFENSE DEPARTMENT AND INTELLIGENCE SYSTEMS under a 10-YEAR PARTNERSHIP, the companies announced Monday.

Financial terms were not disclosed.

IBM and Boeing - the nation's second-largest defense contractor - said the estimated market for the systems to enhance the nation's military communications, intelligence operations and homeland security is about $200 BILLION.

Technologies developed under the alliance will be critical for "NETWORK-CENTRIC" operations in which satellites, aircraft, ships and submarines - as well as tanks, radios and even handheld computers - share information using the same interfaces, standards or protocols, the companies said...

FIG. 2B

Boeing and IBM join forces to gain edge at DOD
Government Computer News 09/20/04
author: Brad Grimes

GCN

To nab NETWORK-CENTRIC WORK at the DEFENSE DEPARTMENT, BOEING CO. and IBM CORP. today announced a 10-YEAR ALLIANCE.

The two companies estimate that DOD will spen $200 BILLION for ground- and space-based systems for net-centric operations.

The partners are pursuing *FOUR INTELLIGENCE* and *EIGHT DEFENSE PROGRAMS* said Jim Albaugh, president and CEO of Boeing's integrated defense systems unit. He declined to name the programs. Depending on the nature of the contracts, he said, either company could lead the effort, with the other acting as subcontractor.

Boeing and IBM will develop technologies to share information across multiple platforms, including satellites, aircraft and handheld radios, company officials said. The two already are investing jointly in software and communications R&D...

FIG. 2C

Boeing IBM will jointly bid on contracts
Seattle Post-Intelligencer 09/21/04
author: Darrell Hassler / Bloomberg (Copyright 2004)

seattlepi.com

The BOEING CO. and IBM CORP. have agreed to work together to compete for military and intelligence agency contracts...

The agreement is for 10 YEARS . IBM, based in Armonk, N.Y., and Chicago-based Boeing formed a committee of executives from both companies to identify opportunities in which they could cooperate for contracts with U.S. MILITARY INTELLIGENCE and homeland defense agencies, the companies said in a statement.

The committee already has identified *FOUR INTELLIGENCE-RELATED AREAS* to pursue new contracts and *EIGHT MILITARY-BUSINESS* opportunities in which to cooperate, James Albaugh, head of Boeing's defense business, said during the call...

U.S. defense and intelligence contracts that focus on computer networks may be worth $200 BILLION over the next 10 years, Boeing said...

FIG. 2D

Boeing IBM announce 10-year partnership
St. Louis Business Journal 09/20/04

ST. LOUIS BUSINESS JOURNAL

BOEING, IBM announce 10-YEAR partnership

The Boeing Co. and IBM Corp. are teaming up to develop various technologies for the DEPARTMENT OF DEFENSE and intelligence systems, the companies said Monday.

The two companies announced plans in a Monday news conference to work together on *FOUR PROGRAMS* in the intelligence area and FOUR PROGRAMS with Department of Defense. The companies said the estimated market for the systems is about $200 MILLION Financial terms were not disclosed.

The 10-year agreement calls for IBM to provide Boeing with information management services and other computer technology to help Boeing provide its goverment customers with NETWORK-CENTRIC OPERATIONS.

"The conflicts of the future will be less dependent on who has the most physical assets such as ships, planes and tanks, but determined by who has the best information and the most efficient means of sharing it among all elements of the fighting forces," said Jim Albaugh, president and chief executive of Boeing's St. Louis-based Integrated Defense Systems unit. "With capabilities enhanced by this new technology, our defense and intelligence community will gather real-time information and communicate it across all levels of command for maximum effect."...

FIG. 2E

TEXT DIFFERENTIATION METHODS, SYSTEMS, AND COMPUTER PROGRAM PRODUCTS FOR CONTENT ANALYSIS

CROSS-REFERENCE TO RELATED APPLICATIONS

The contents of U.S. Pat. No. 6,611,825, entitled Method and System for Text Mining using Multidimensional Subspaces, and U.S. Pat. No. 6,701,305, entitled Methods, Apparatus and Computer Program Products for Information Retrieval and Document Classification Utilizing Multidimensional Subspace, are incorporated by reference.

FIELD OF THE INVENTION

The present invention relates generally to text data analysis and, more particularly, to identifying non-similar content between documents with similar content.

BACKGROUND

Data mining broadly seeks to expose patterns and trends in data, and most data mining techniques are sophisticated methods for analyzing relationships among highly formatted data, i.e., numerical data or data with a relatively small fixed number of possible values. However, much of the knowledge associated with an enterprise consists of textually-expressed information, including databases, reports, memos, e-mail, web sites, and external news articles used by managers, market analysts, and researchers.

In comparison to data mining, text data analysis (also sometimes called text mining or text analysis), refers to the analysis of text and may involve such functions as text summarization, information visualization, document classification and clustering (e.g., routing and filtering), document summarization, and document cross-referencing. Text data analysis may help a knowledge worker find relationships between individual unstructured or semi-structured text documents and semantic patterns across large collections of such documents. For example, U.S. Pat. Nos. 6,611,825 and 6,701,305 describe particular text data analysis methods. Text data analysis sometimes is a supporting aspect of data mining, but the concepts can be used independently as separate information retrieval methods, or together, such as to provide a data mining application that incorporates the ability to analyze text data.

Once a suitable set of documents and terms has been defined for a document text collection, various document retrieval techniques can be applied to the collection, such as keyword search methods, natural language understanding methods, probabilistic methods, and vector space methods.

Results of document retrieval techniques are typically presented as lists of documents, typically related to search terms. Often the list of related documents is sorted by relevancy to search terms and provides linked URL references for the knowledge worker to explore the full document. Lists of related documents also are often supplemented by extracts of the documents containing "hits" of the search terms (text summarization), helping the knowledge worker identify the context and uses of the search terms in the documents. However, a knowledge worker presented with a list of related documents from a document retrieval application only has the benefit of any relevancy ordering or, if a document retrieval application is supplemented with text data analysis, a knowledge worker only has the additional benefit of such supplemented techniques as content ordering, text summarization, or classification for the document list and extracts from the documents to determine which documents to explore. Unfortunately, this type of typical searching process only provides a knowledge worker with limited information, and sometimes misleading information. For example, documents that include one or more high frequency terms may receive a misleadingly good relevancy score and be elevated in the result list even though those documents include few, if any, of the other terms of the query. Many variations on this general searching process have been proposed or developed, such as weighting various terms and reducing the impact of high-frequency terms. Regardless of the improvements of the algorithms or presentation features, the knowledge worker remains limited by underlying algorithms and, particularly, the presentation of the document results, typically a list of URL references with exemplary document extracts. Similarly, results of text data analysis are often presented simply by versioning control that identifies editing and other differences between two documents and does little to help a knowledge worker analyze the content of one or more documents.

SUMMARY OF THE INVENTION

Embodiments of the present invention for improved text data analysis generally may be used to supplement conventional text data analysis, data mining, and document retrieval techniques and applications. For example, when a conventional document retrieval technique results in a number of documents which have similar content, an embodiment of the present invention of an improved text data analysis method, system, or computer program product may be used to further understand the relationships between these documents. An improved text data analysis method of an embodiment of the present invention identifies differences between documents with similar content, not merely similar terms, and generates results for presentation. Such an improved text data analysis method and its results would assist a knowledge worker in determining which documents may include content that distinguishes the different documents from the other documents with overall similar content, but not exactly the same content. Such an improved text data analysis method could also be used to further support and refine a data mining application, but may also be used independently and with other information retrieval applications.

The present invention provides improved methods, apparatus, and computer program products for identifying content from text data, such as from two or more documents or sections of documents or from a plurality of text documents (also referred to as a text data collection). Text differentiation is performed by analyzing documents with similar content to identify non-similar content (i.e., content differences or differentiated content) in the documents. Generally a limited set of two or more documents is analyzed to identify non-similar content, or parts of content. Documents can be from any source, including a sequence of news stories updating a particular topic, multiple news stories on a particular topic from numerous sources, a document cluster, or search results from a search engine or database query. The origin of the limited set of documents may vary depending on an application of an embodiment of the present invention. For example, in a further aspect of the invention, text differentiation is performed by identifying non-similar content in text of documents from multiple news stories on a particular topic from numerous sources. Typical news stories about a particular event describe the same or similar facts related to the event in different ways. Many news stories are re-tellings of original news stories about the event. Accordingly, these news stories will be very similar documents with similar content. However, the news stories are likely not identical, and some of the news stories may include content different from the other news stories, such as factual discrepancies or additional information. In a further aspect of the invention, text differentiation is performed by identifying non-similar content in text of documents identified using a query. Typical search results identify documents related to search terms, many of which often include similar content. However, these documents are not identical, but may include different emphases, factual discrepancies, different subsets of information, etc. The content differences between the news stories or documents can be as important or more important to a knowledge worker than the content similarities. Finding information common to many documents is relatively simple. Identifying content differences between two or more documents has traditionally been and continues to increasingly become a difficult task, particularly to perform manually. Embodiments of the present invention, however, provide the ability to find content hidden within two or more documents with similar content. For example, a particular query may include one hundred documents with high relevance to the search terms; but a knowledge worker may be most interested in those documents that include content in addition to or different from certain common information shared by most or all of the hundred documents. Or a pre-selected, limited set of five documents may have very similar content with important differences hidden in one or more of the documents. A knowledge worker may want to know about different keywords, entities (e.g., personal, geographic, company names, governments, organizations, etc.), or subject matter (e.g., section or paragraph topics) included in portions of one or more documents, but not included in the majority of documents. A knowledge worker may use text differentiation to quickly identify key content differences between similar documents, and avoid spending time reviewing overlapping content in the similar documents.

According to one aspect, the method identifies non-similar content from documents that contain similar content. Related documents are analyzed not for the content they share but instead for the non-similar content that one or more documents adds to, subtracts from (lacks in), or is different from (contradicts) the base of common information. Results of a text differentiation operation may be generated in a manner that represents the non-similar content. The identification of non-similar content may include finding paragraphs of similar content; determining content differences between the paragraphs, such as using an ontology and an entity or keyword (or topic word) extraction and/or subject matter identification mode; and marking the content differences. Alternatively, or in addition, identification of non-similar content may involve determining absolutely unique and/or non-universal content.

The limited set of documents that is analyzed for non-similar content may be obtained using a document selection mode such as manually identifying two or more documents or using a set of documents from search results, which may be further refined to reduce set of documents to a limited set of documents less than the search engine results. The document selection mode may be based upon a query that includes one or more search terms, a "query by example" input to allow the user to enter or provide an example document or section or paragraph of a document, or a "more like this" selection to allow the user to refine the query to a particular document or section or paragraph of a document. For example, a plurality of text documents may be analyzed for documents related to search terms of a document selection query, and two or more related documents may be extracted for further analysis. The extraction of related documents may be based on a predetermined threshold relevancy limit, such that only documents above the threshold relevancy limit are extracted. Alternatively, or in addition, the extraction of related documents may be limited to a predetermined number of documents with the highest relevancy scores with respect to the search terms. A user submitting a document selection query may be capable of setting or selecting a predetermined threshold relevancy limit or predetermined number of documents to be compared for non-similar content.

Results of a method, apparatus, or computer program product of an embodiment of the present invention need not be a visual display, but may simply be adding or editing database fields related to one or more of the analyzed documents or modification of or creation of a result document such as an edited XML document with metadata representing results of a text differentiation operation. Alternatively, or in addition, an embodiment of the present invention may provide a presentation of text data analysis (often a visual display or depiction when presented to a knowledge worker), comparing two or more documents or sections or paragraphs of two or more documents, such as using highlighting to identify content in a document or section or paragraph of a document not present in the other document or documents in the text data analysis. Further, for example, a presentation of results may include a list with links to the related documents including non-similar content. The document links may be listed above or next to abstracts or summarizations of the non-similar content. Similarly, this aspect of the present invention also may provide extraction of a subset of related documents of similar content such that the identification of non-similar content may occur independently within each subset of documents and the results are grouped by these subsets of documents of similar content.

These characteristics, as well as additional details, of the present invention are further described herein with reference to these and other embodiments.

BRIEF DESCRIPTION OF THE DRAWING(S)

Having thus described the invention in general terms, reference will now be made to the accompanying drawings.

FIG. 1 is a flow diagram illustrating logic of an embodiment for performing text differentiation of the present invention.

FIGS. 2A, 2B, 2C, 2D, and 2E are a presentation of a text data analysis and presentation application of an embodiment of the present invention.

DETAILED DESCRIPTION

Figure 1:
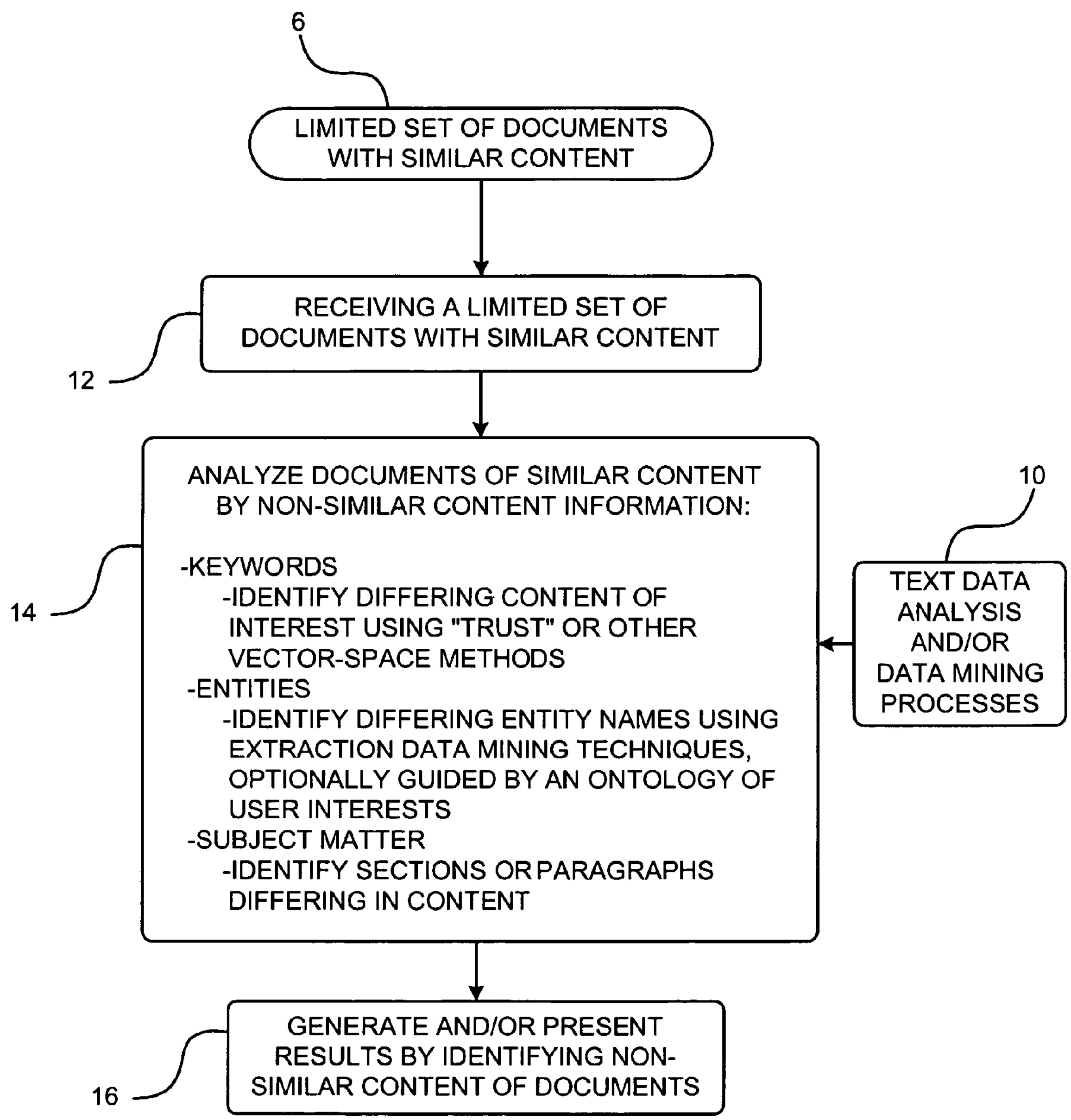

The present invention will be described more fully with reference to the accompanying drawings. Some, but not all, embodiments of the invention are shown. The invention may be embodied in many different forms and should not be construed as limited to the described embodiments. Like numbers and variables refer to like elements and parameters throughout the drawings.

Although the second example embodiment of the present invention is described with reference to a search engine application and results thereof, embodiments of the present invention are not the same as and do not require search engine (document retrieval/query) operations, but may be used for receiving and analyzing two or more documents from any source, such as described with reference to the first example embodiment of the present invention. For example, documents may be identified and/or provided from search engine results, database search results, clustering of documents of similar type, a sequence of news stories providing updates on a particular topic, or multiple news stories on the same topic from different news sources. Accordingly, the present invention is not limited by or applicable only to document retrieval or data mining applications, but may be used alone as a text data analysis application, or combined with various other applications, certainly including, but not limited to, document retrieval and data mining applications.

"Non-similar content" may be defined as content differences representing content unique to a single document in all the searched documents, a single document in a reduced set of the searched documents, or a limited number of documents in a plurality of documents. For example, if a search of one hundred documents results in twenty relevant documents that can be divided into five subsets of related documents of similar content, non-similar content may be (i) content unique to a single document in the one hundred documents, (ii) content unique to a limited number of documents in the one hundred documents, (iii) content unique to a single document in the twenty relevant documents, (iv) content unique to a limited number of documents in the twenty relevant documents, (v) content unique to a single document in one of the five subsets of related documents of similar content, or (vi) content unique to a limited number of documents in one of the five subsets of related documents of similar content. Non-similar content refers to content differences, and is not the same as versioning control that identifies editing and other differences that are not related to the content of the document.

The use of the term "document" is inclusive of merely a portion of a document, such as a section or a paragraph of a document. Use of both terms document and section of a document together are not meant to distinguish between the an entire document and a section of a document but to emphasize, where potentially less apparent, that less than a whole document may apply and is expressly included, even though already included through use of the term document. In addition, the term "document" also encompasses text generated from images and graphics or text generated from audio and video objects, or other multimedia objects.

As mentioned, embodiments of the present invention are further described with reference to content searches on the Internet, content searches of corporate, organization, or governmental databases, and content searches of other types of document repositories. For example, embodiments of the present invention may be used to compare numerous similar documents returned from searches on the Internet. Text differentiation of the present invention identifies the ways in which documents are different in content and can be used for any task that involves comparing two or more documents with similar content where the content differences between the documents are of interest, such as tracking new developments in ongoing news stories, although text differentiation can be used in any application, including, but not limited to, intelligence, marketing, data management, and research. Similarity in content refers to commonalities in subject matter, topics, and/or events, not merely commonalities in similar terms. For example, two documents that both include the terms "2005," "Saturn," and "project" may not be similar in content by the fact that one document refers to a 2005 project related to the planet Saturn and the other document may be a web blog of a child talking about receiving a 2005 Saturn for his or her sixteenth birthday and a project at school. Similarity in content refers instead to documents on the same subject matter, topic(s), and/or event(s), which will typically also include commonalities in terms as a consequence of being similar in content.

The methods, apparatus, and computer program products of the present invention perform text differentiation operations and, more particularly, the identification of non-similar content from documents of similar content within the plurality of documents. In performing these operations, the methods, apparatus, and computer program products of the present invention are capable of using one or more data mining process to support the analysis and extraction of documents, identification of non-similar content, and presentation of results. For example, an embodiment of the present invention may use the text representation using subspace transformation data mining processes of U.S. Pat. Nos. 6,611,825 and 6,701,305 for identifying non-similar content in the extracted documents with similar content. Accordingly, by using one or more data mining process, the methods, apparatus, and computer program products of the present invention are capable of processing a large data set without requiring prior knowledge of the data, thereby identifying non-similar content in documents.

Figure 3:
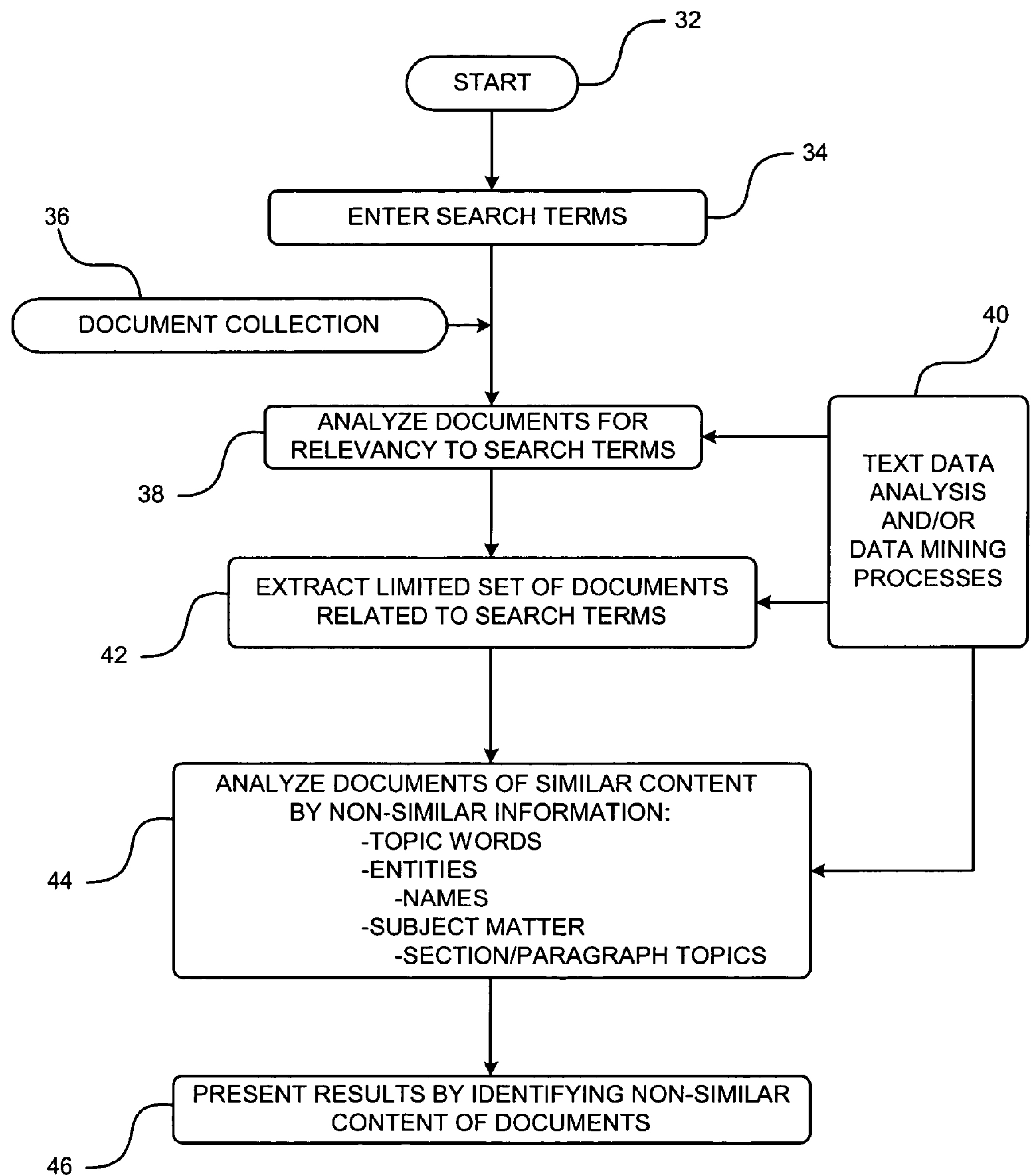
FIG. 3 is a flow diagram illustrating logic of an embodiment for performing text differentiation of the present invention.

FIG. 1 is a flow diagram illustrating logic for performing text differentiation of an embodiment of the present invention. The logic begins by identifying a limited set of documents with similar content at block 6. The limited set of documents can be from any source, including search results from a search engine or database query, a document cluster, a sequence of news stories updating a particular topic, or multiple news stories on a particular topic from numerous sources. The origin of the limited set of documents may vary depending on the application of an embodiment of the present invention. For example, the flow diagram of FIG. 3 is representative of an embodiment of the present invention in a search engine application for identifying non-similar content in text of documents related to search terms of a query.

Once a limited set of documents is identified, text differentiation involves receiving the documents, as shown at block 12, to permit a system, apparatus, or method of an embodiment of the present invention to analyze the documents for information of non-similar content as shown at block 14. One or more text data analysis and/or data mining processes 10 may be used at block 14 to perform analysis of the limited set of documents. For example, a text data analysis process or a data mining process, such as described in U.S. Pat. Nos. 6,611,825 and 6,701,305, may identify, or at least attempt to find, paragraphs, entities, and/or subject matter of similar content. The same or a different text data analysis and/or data mining process 10 may be used to determine content differences between paragraphs identified as having similar content, and/or a text data analysis or data mining process may determine content differences between the documents as a whole. For example, TRUST and other text data analysis and/or data mining technologies may be used to identify differences in a collection of documents which are very similar in content. One example for identifying differences in a collection of documents is provided. A user issues a query (usually initiated by entering a set of one or more terms and/or a document, a section of a document, or other database matches) to retrieve a set of matched documents. The user then may use TRUST representation of the returned documents in conjunction with a clustering algorithm (such as the K-Means clustering algorithm) to cluster the returned set of documents to identify groups of documents that are very similar in content. For example, if the query is "Saturn 2005," the clustering results might reveal that there are three clusters of returned documents. One set about the planet Saturn, another about the Saturn automobile, and the third about a corporate project named Saturn. If the user's interest is the automobile, the second cluster may be selected for further investigation for differences. Other technologies may be used to accomplish this as well. Alternatively, the user may use "query by example" (i.e., "more like this" selection in some search engines) to find a set of documents that are very similar to one of the returned documents of interest. Other ways of obtaining a set of two or more documents that are highly similar in content may be used. As searching is refined, and document sets are decreased to fewer documents, the content of the documents typically will be more similar. The system may then use TRUST or one or more other technologies to generate keywords for each of the paragraphs in each document in this document set. These may be used to help compare where these documents differ. Even documents with very similar content can have differences. For example, if document 1 and document 2 each has 5 paragraphs, TRUST may identify that paragraphs 1, 2, 3 and 4 in each document are practically identical, but that paragraphs 5 have lower similarity scores, and, thus, may have content differences. However, while the previous example of text differentiation describes a paragraph-by-paragraph operation, other embodiments of the present invention need not operate at a paragraph-by-paragraph level, but may operate, for example, by non-corresponding sections of text or simply at a document level. The system may use one or more entity extraction technologies to identify important entities (e.g. person names, locations, time, company names, etc.) in each document in this set. A keyword or subject matter extraction technology may also be used. For example, an extraction mode of a text data analysis or data mining process may be used to identify, or mark for result presentation purposes such as at block 16, specific instances of content, such as non-similar content uniquely occurring in a single document (absolute uniqueness of non-similar content) or content not occurring universally throughout all of the documents (non-universal non-similar content). An extraction step may optionally be guided by use of an ontology. For example, a text data analysis or data mining process may be guided by an ontology related to a user's interests, such as derived from a query input in a search engine application. Often there are existing ontologies that users may use and/or modify for use, such as the WordNet of Princeton University, available at http://wordnet.princeton.edu/. Many companies have established similar enterprise-level ontologies as well, such as The Boeing Company's Technical Library's Thesaurus Terms. By way of an example use of an ontology, if the user's interest is the automobile Saturn, the user may select an ontology that only picks out differences in features and price in an automobile, but ignores any information about the spokesman or reviewer mentioned in the articles, i.e., ignores references to people or at least particular people. The system may perform a combination of one or more of the steps above, or other steps, to identify differences in a set of similar documents.

The function of an embodiment of the present invention of analyzing documents of similar content to identify non-similar information may be compared to the process of de-dupping, also referred to as de-duping and de-duplicating. De-dupping commonly refers to removing duplicate records in databases, such as removing all but one set of identical or nearly identical documents in a database like a library catalog. De-dupping also refers to removing repeated values from an input vector in mathematics, returning a new vector that has just one copy of each distinct value in the input; avoiding duplicate entries or elevated weightings or counts in document summaries of metadata. Although not an identical task or feature to de-dupping, an embodiment of the present invention may analyze documents of similar content by ignoring content in a document that is similar to content in another document, effectively de-dupping the common content and focusing only on the non-similar content in the documents.

By way of example, a presentation of results of a text data analysis embodiment for text differentiation of the present invention is provided in FIGS. 2A, 2B, 2C, 2D, and 2E. Each figure represents a section of a news story related to the same event, the announcement of a Boeing and IBM partnership. While the new stories describe the same event, the stories are not identical. Typical news stories about a particular event describe the same or similar facts related to the event in different ways. Many news stories are re-tellings of original news stories about the event. Thus, many news stories on the same event will be very similar documents with similar content. However, the news stories may not be identical, and some of the news stories may include content different from the other news stories, such as factual discrepancies or additional information. Accordingly, text differentiation may be performed to identify the non-similar content in the text of the news stories.

The text differentiation which has been performed on the news stories of FIGS. 2A, 2B, 2C, 2D, and 2E, has highlighted various terms (words, phrases, numbers, etc.), to allow a knowledge worker the ability to quickly review the documents to identify the key terms (underlined or alternatively, for example, in a color such as blue text), secondary terms (bolded and italicized or alternatively, for example, in a color such as green text) such as identified by an ontology or thesaurus in relation to the key terms, and differentiated terms (underlined bolded text or alternatively, for example, in a color such as red text). Result presentations may be in many forms, such as the presentation of highlighted sections of relevant text in FIGS. 2A, 2B, 2C, 2D, and 2E. While results may be presented in various manners, highlighting, such as text coloring, text backgrounds, bolding, underlining, sizing, font, brightness, flashing, moving, etc., may be useful for allowing a knowledge worker the ability to visually identify content differences in multiple documents. Similarly, instead of merely having two extremes, such as identical or opposites, text differentiation may present non-similar content (differentiated content) along a continuum, such as presented by gradations of color or brightness where the brighter the term, the less similar and more different the term is from what may be found in the other documents. Thus, if some content is absolutely unique, it may be presented most brightly; if some other content is next-to-absolutely unique where one or two other documents present the same content, it may be presented slightly less bright; and if some further content is not-universally unique where three or more other documents include the same content, the content may be presented even less brightly. Similar other approaches may be used to present text differentiation along a continuum of non-similarity, including, but not limited to, using a differentiation scoring methodology, rather than a uniqueness methodology, to determine gradations of contrast, such as where content completely different from content in at least one other document (e.g., $200 million instead of $200 billion) receives a differentiation scoring of 100% correlating to a contrast of 100% so the content is entirely visible, content close but not identical to all other documents (e.g., $1.321 million instead of $1.32 million) receives a differentiation scoring of 75% correlating to a contrast of 75%, and content the same as all in the other documents receives a differentiation scoring of 50% correlating to a contrast of 50%, thereby emphasizing what content remains most visible as the quantitatively more non-similar content, and decreasing non-similarity by visibility, and aiding a knowledge worker to quickly focus on non-similar content. One method of preparing the results of text differentiation is to create a markup file, such as an XML or HTML file, of the analyzed documents or sections of text, but any number of manners of preparing and presenting results of text differentiation may be used.

In effect, an embodiment of the present invention is capable of identifying non-similar content (differentiated content) between two or more documents or sections of documents having similar content, such as the set of news stories on the same event of FIGS. 2A, 2B, 2C, 2D, and 2E. Typically, the more similar the content of the documents or sections of documents, the more useful and better the results of an embodiment of the present invention, because differences will likely appear more hidden or buried in one or more of the documents, and will easily be identified as a difference that a knowledge worker can quickly focus on for consideration and/or analysis.

To further describe the present invention, an embodiment is described below in a search engine application. FIG. 3 is a flow diagram illustrating logic for performing text differentiation of an embodiment of the present invention in a search engine application. The logic moves from a start block 32 to a search terms entry block 34 representing the initiation of a query by a knowledge worker. A query may include one or more search terms entered in a conventional manner using text input. Alternatively, an embodiment of the present invention may initiate a query by a knowledge worker importing one or more documents, or similarly inputting a portion of at least one document. The document(s), or portion(s) thereof, can be interpreted by a text data analysis and/or data mining process to extract search terms, such that the content of the document(s), or portion(s) thereof, becomes the search terms for the query.

A document collection 36, representing a plurality of text documents, is acquired, selected, known, or otherwise accessible for performing text differentiation. Text differentiation of the present invention involves comparing two or more documents to identify non-similar content between the documents, typically comparing documents with similar content by extracting documents with similar content from a document collection. For example, the document collection 36 may be documents that are searchable using a particular corporate database search, a search engine application on the Internet, or the like.

One or more text data analysis and/or data mining process 40 are used at block 38 to analyze the documents in the plurality of text documents to identify documents that are related to the search terms of the query. For example, a text data analysis and/or data mining process 40 may attempt to identify documents with high relevancy scores with respect to the search terms. Different conventional data mining processes may be used to analyze the document collection 36. The relevancy analysis of block 38 is provided for the extraction of relevant documents at block 42.

At block 42 one or more text data analysis and/or data mining process 40 may be used to extract a limited set of documents related to the search terms. Accordingly, text differentiation may be performed on any number of documents from the original data collection 36. Extracting a limited set of documents related to the search terms narrows the focus for the identification of non-similar content. For example, the text differentiation process may be configured to extract only related documents that exceed a predetermined threshold relevancy limit or configured to extract only a predetermined number of documents. If only a few similar documents relate to the search terms of the query, the documents may contain significant amounts of non-similar content. By limiting to highly similar documents that are extracted, the text differentiation may identify non-similar content in documents that are related to the search terms of the query and are very similar to each other, thereby reducing the non-similar content between the documents. When many documents are very similar, text differentiation of the present invention is particularly useful, because it can identify the non-similar content, thereby allowing the knowledge worker to decide where to focus his or her attention and assist him or her in assembling and fusing information from multiple documents. An embodiment of the present invention may extract documents related to search terms into subsets of documents of similar content. Then these subsets of documents can be analyzed separately for non-similar content.

After extracting a limited set of documents related to the search terms, at block 44 one or more text data analysis and/or data mining process 40 may be used to analyze the extracted documents for non-similar content. For example, non-similar content may include different keywords, entities (personal, geographic, company names, governments, organizations, etc.), or subject matter (section or paragraph topics) included in one or more documents, but not included in the majority of documents.

At block 46 an embodiment of the present invention highlights differences and/or presents the results of the query. Results of text differentiating can take any number of forms, just as conventional search results are provided in various forms. One typical presentation may present relevant sections of the compared documents with highlighting (such as in text coloring, text background coloring, bolding text, etc.) to identify content differences using an HTML or XML markup document. Another presentation may list the extracted documents with abstracts or summaries of the non-similar content for each document provided below a URL link to each document. In this manner, a knowledge worker can scan the list of results for non-similar content to identify documents that might include different or additional content of interest to the knowledge worker. If related documents are extracted into subsets of documents with similar content, the presentation of results may be organized by the subsets of documents.

Each block or step of the flowcharts and combinations of blocks or steps in the flowcharts of FIGS. 1 and 3 can be implemented by computer program instructions or other means. Although computer program instructions are discussed below, an apparatus according to the present invention can include other means, such as hardware or some combination of hardware and software, including one or more processors or controllers for performing text differentiation.

Figure 4:
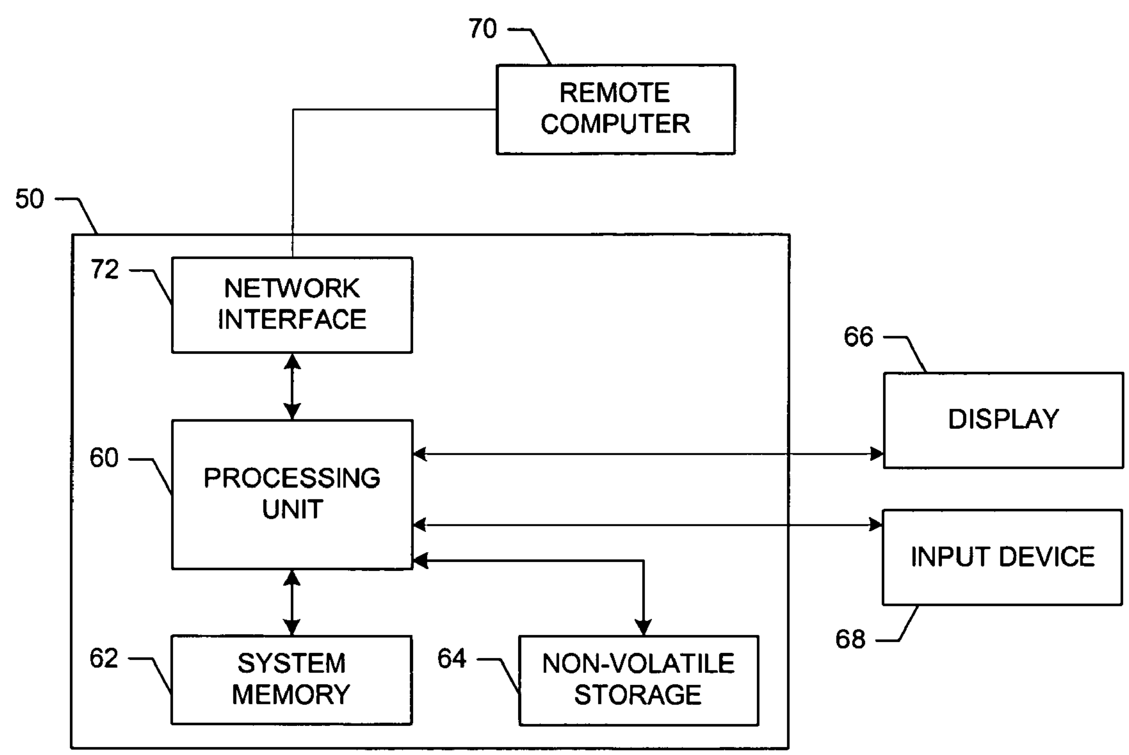
FIG. 4 is a block diagram of a general purpose computer system suitable for implementing an embodiment of the present invention.

In this regard, FIG. 4 depicts the apparatus of one embodiment including several of the key components of a general purpose computer 50 on which the present invention may be implemented. A computer may include many more components than those shown in FIG. 4. However, it is not necessary that all of these generally conventional components be shown in order to disclose an illustrative embodiment for practicing the invention. The computer 50 includes a processing unit 60 and a system memory 62 which includes random access memory (RAM) and read-only memory (ROM). The computer also includes nonvolatile storage 64, such as a hard disk drive, where data is stored. The apparatus of the present invention can also include one or more input devices 68, such as a mouse, keyboard, etc. A display 66 is provided for viewing text mining data, and interacting with a user interface to request text mining operations. The apparatus of the present invention may be connected to one or more remote computers 70 via a network interface 72. The connection may be over a local area network (LAN) or a wide area network (WAN), and includes all of the necessary circuitry for such a connection. In one embodiment of the present invention, the document collection includes documents on an Intranet. Other embodiments are possible, including a local document collection, i.e., all documents on one computer, documents stored on a local or network server, documents stored on a client in a network environment, etc.

Typically, computer program instructions may be loaded onto the computer 50 or other programmable apparatus to produce a machine, such that the instructions which execute on the computer or other programmable apparatus create means for implementing the functions specified in the flowchart block(s) or step(s). These computer program instructions may also be stored in a computer-readable memory, such as system memory 62, that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto the computer or other programmable apparatus to cause a series of operational steps to be performed on the computer 50 or other programmable apparatus to produce a computer implemented process such that the instructions which execute on the computer 50 or other programmable apparatus provide steps for implementing the functions specified in the flowchart block(s) or step(s).

Accordingly, blocks or steps of the flowcharts of FIGS. 1 and 3 support combinations of means for performing the specified functions, combinations of steps for performing the specified functions and program instruction means for performing the specified functions. For example, a data input software tool of a search engine application is an example means for receiving a query including one or more search terms. Similar software tools of applications of embodiments of the present invention are means for performing the specified functions. Each block or step of the flowchart, and combinations of blocks or steps in the flowcharts, can be implemented by special purpose hardware-based computer systems which perform the specified functions or steps, or combinations of special purpose hardware and computer instructions. For example, an input of the present invention may include computer software for interfacing a processing element with a user controlled input device, such as a mouse, keyboard, touch screen display, scanner, etc. An output of the present invention may include the combination of display software, video card hardware, and display hardware. And a processing element may include a controller, such as a central processing unit (CPU) with a printed circuit board or microprocessor, arithmetic logic unit (ALU), and control unit.

The invention should not be limited to the specific disclosed embodiments. Specific terms are used in a generic and descriptive sense only and not for purposes of limitation.

That which is claimed:

1. A computer-implemented method of analyzing electronic files containing text data comprising a plurality of terms, wherein the method comprises:

selecting two or more electronic files from a plurality of electronic files, wherein the selected electronic files comprise similar text data, wherein the similar text data comprises at least one of a common subject matter, a common topic, and a common event;

temporarily storing predetermined parameters for analyzing the text data of the selected electronic files;

analyzing the selected electronic files to identify non-similar text data within the similar text data, wherein the identification of non-similar text data within the similar text data is based at least in part upon the stored predetermined parameters, wherein the non-similar text data comprises at least one of a content difference in the text data of the selected electronic files representing one of content unique to a single one of the selected electronic files and content unique to at least two but less than all of the selected electronic files, and wherein analyzing the selected electronic files to identify non-similar text data within the similar text data uses a subspace projection based on a distribution of the frequency of occurrences of each of the terms in each of the selected electronic files and comprises:

(a) constructing a term-by-document frequency matrix, wherein each entry of the term frequency matrix is the frequency of occurrence of one of the terms in a respective one of the selected electronic files;

(b) projecting a representation of at least a portion of the term-by-document frequency matrix into a lower dimensional subspace to create an original term subspace for the selected electronic documents;

generating an electronic file based at least partly on the non-similar text data of the selected electronic files, wherein generating the electronic file comprises electronically marking the non-similar text data of the selected electronic files; and electronically presenting the marked non-similar text data providing the user the ability to compare the non-similar text data within the similar text data.

2. A method according to claim 1, wherein electronically presenting the marked non-similar text data comprises presenting at least portions of the selected electronic files, and wherein non-similar text data of the selected electronic files is identified by electronically highlighting the non-similar text data in the presented portions of the selected electronic files.

3. A method according to claim 1, wherein analyzing the selected electronic files to identify the non-similar text data comprises determining non-similar text data along a range of uniqueness based at least in part of the amount of text data shared with the other selected electronic files, wherein generating the electronic file comprises electronically marking the non-similar text data with a correlation to the range of uniqueness of the non-similar text data.

4. A method according to claim 3, wherein the electronically marking the non-similar text data with a correlation to the range of uniqueness of the non-similar text data is performed by electronically adjusting the displayed brightness of color of the non-similar text data.

5. A method according to claim 1, wherein analyzing the selected electronic files to identify the non-similar text data comprises:

finding sections of similar text data;

determining differences between the sections; and electronically marking the differences, such that the electronically marked differences can be used for generating an electronic file.

6. A method according to claim 5, wherein the determination of differences comprises combining the use of an ontology of user interest and an extraction mode selected from the group of: entity extraction, keyword extraction, and subject matter identification, wherein the ontology of user interest is derived at least in part from receiving one or more terms of interest.

7. A method according to claim 1, wherein analyzing the selected electronic files to identify the non-similar text data comprises:

determining non-similar text data absolutely unique to any one selected electronic file; and determining non-similar text data not universal to all other selected electronic files.

8. A method according to claim 1, wherein the selecting the electronic files comprises obtaining a limited set of electronic files from one of the selection modes selected from the group of: manual selection, search engine results, database search results, document clustering, news story sequencing, and news story source compilations.

9. A method according to claim 8, wherein obtaining a limited set of electronic files with similar text data comprises refining the results of a search engine query.

10. A method according to claim 1, further comprising receiving a query including one or more search terms;

analyzing the plurality of electronic files for electronic files related to the search terms; and extracting two or more electronic files related to the search terms and defining at least two subsets of electronic files related to the search terms for being selected, wherein the extracted electronic files of each subset include similar text data.

11. A method according to claim 10, wherein:

the extraction of two or more electronic files related to the search terms comprises extracting subsets of electronic files related to the search terms with similar text data;

analyzing the selected electronic files to identify the non-similar text data comprises identifying non-similar text data of each extracted subset of electronic files related to the search terms with similar text data; and generating an electronic file further comprises ordering the query results by the subsets of electronic files of similar text data.

12. A method according to claim 10, wherein the receipt of the query comprises importing at least a portion of at least one electronic file, wherein the text data of the imported electronic file are the search terms, and wherein the analysis of the plurality of electronic files comprises identifying electronic files with similar text data to the imported electronic file.

13. A method according to claim 12, wherein the extraction of the subsets of electronic files related to the search terms comprises extracting the set of electronic files representing the electronic files identified with similar text data to the imported electronic file.

14. A method according to claim 10, wherein the extraction of the subsets of electronic files related to the search terms comprises discarding all but a predetermined number of electronic files with the highest computed relevancy score with respect to the search terms.

15. A method according to claim 1, wherein at least one of the selected electronic files comprises at least one of a new story; a web blog; text data generated from an image, graphic, audio object, video object, or multimedia object; and search engine results.

16. A method according to claim 1, wherein at least one of the selected electronic files comprises a news story.

17. A computer program product for analyzing electronic files containing text data comprising a plurality of terms, the computer program product comprising a computer-readable storage medium having a computer program stored therein, the computer program comprising:

first computer program code for selecting two or more electronic files from a plurality of electronic files, wherein the selected electronic files comprise similar text data, wherein the similar text data comprises at least one of a common subject matter, a common topic, and a common event;

second computer program code for temporarily storing predetermined parameters for analyzing the text data of the selected electronic files;

third computer program code for analyzing the selected electronic files to identify the non-similar text data within the similar text data, wherein the identification of non-similar text data within the similar text data is based at least in part upon the stored predetermined parameters, wherein the non-similar text data comprises at least one of a content difference in the text data of the selected electronic files representing one of content unique to a single one of the selected electronic files and content unique to at least two but less than all of the selected electronic files, and wherein analyzing the selected electronic files to identify non-similar text data within the similar text data uses a subspace projection based on a distribution of the frequency of occurrences of each of the terms in each of the selected electronic files and comprises:

(a) constructing a term-by-document frequency matrix, wherein each entry of the term frequency matrix is the frequency of occurrence of one of the terms in a respective one of the selected electronic files;

(b) projecting a representation of at least a portion of the term-by-document frequency matrix into a lower dimensional subspace to create an original term subspace for the selected electronic documents;

fourth computer program code for generating an electronic file based at least partly on the non-similar text data of the selected electronic files, wherein said fourth computer program code further comprises computer program code for electronically marking the non-similar text data of the selected electronic files; and fifth computer program code for electronically presenting the marked non-similar text data providing the user the ability to compare the non-similar text data within the similar text data.

18. A computer program product according to claim 17, wherein the third computer program code further comprises computer program code for finding sections of similar text data in the selected electronic files, determining differences between the sections of similar text data, and electronically marking the differences, such that the electronically marked differences are capable of being used by the fourth computer program code.

19. A computer program product according to claim 17, wherein the third computer program code further comprises computer program code for determining non-similar text data absolutely unique to any one selected electronic file and determining non-similar text data not universal to all other selected electronic files.

20. A computer program product according to claim 17, further comprising sixth computer program code for receiving a query including one or more search terms, wherein the third computer program code identifies non-similar text data at least in part based on the search terms.

21. A computer program product according to claim 20, further comprising:

seventh computer program code for analyzing the plurality of electronic files for electronic files related to the search terms; and eighth computer program code for extracting two or more electronic files related to the search terms from the plurality of electronic files, the extracted electronic files determined to be related to the search terms by the seventh computer program code, wherein the extracted electronic files are configured to be selected by the first computer program code.

22. A computer program product according to claim 21, wherein the eighth computer program code further comprises computer program code for computing a relevancy score for electronic files based at least in part on the relationship of the text data of the electronic files to the search terms, and wherein the eighth computer program code for extracting two or more electronic files limits the number of electronic files extracted based at least in part on the computed relevancy scores of the electronic files.

23. A computer program product according to claim 20, wherein the fifth computer program code further comprises computer program code for electronically presenting results of the query based at least partly on the non-similar text data of the extracted electronic files.

24. An apparatus for analyzing electronic files containing text data, the apparatus comprising:

an input, configured to select two or more electronic files from a plurality of electronic files, wherein at least two of the electronic files comprise similar text data;

a processing element configured to temporarily storing predetermined parameters for analyzing a text data; configured to analyze the selected electronic files to identify non-similar text data of the selected electronic files; configured to generate an electronic file based at least partly on the non-similar text data of the selected electronic files, wherein generating the electronic file comprises electronically marking the non-similar text data of the selected electronic file; and configured to electronically present the marked non-similar text data providing the user the ability to compare the non-similar text data within the similar text data; and an output configured to perform at least one of storing, transmitting, and displaying the generated electronic file.

25. An apparatus according to claim 24, wherein the output comprises a display monitor configured to display the marked non-similar text data of the selected electronic files.

26. An apparatus according to claim 24, wherein:

the input is further configured to receive a query including one or more search terms; and the processing element is further configured to analyze the plurality of electronic files to identify electronic files related to the search terms, extract at least one of the identified electronic files related to the search terms, and present the extracted electronic files to the input for selection.

27. An apparatus according to claim 26, wherein the output is further configured to present results of the query based at least partly on the non-similar text data of the extracted electronic files.

28. An apparatus according to claim 26, wherein the processing element is further configured to extract at least two subsets of electronic files related to the search terms with similar text data and present the extracted electronic files to the input for selection.

29. An apparatus according to claim 28, wherein the output is further configured to present results of the query based at least partly on the non-similar text data of the extracted electronic files, wherein electronically presenting the marked non-similar text data is ordered by the subsets of electronic files.

30. An apparatus according to claim 26, wherein the input is further configured to import at least a portion of at least one electronic file, wherein the text data of the imported electronic file are the search terms, and wherein the processing element is further configured to identify electronic files with similar text data to the imported electronic file.

31. An apparatus according to claim 26, wherein the processing element is further configured to exclude all but a predetermined number of electronic files with the highest computed relevancy score with respect to the search terms for extraction.

* * * * *